United States Patent
Borlick et al.

(10) Patent No.: US 11,520,631 B2
(45) Date of Patent: *Dec. 6, 2022

(54) DETERMINATION OF MEMORY ACCESS PATTERNS OF TASKS IN A MULTI-CORE PROCESSOR

(71) Applicant: INTERNATIONAL BUSINESS MACHINES CORPORATION, Armonk, NY (US)

(72) Inventors: Matthew G. Borlick, Tucson, AZ (US); Lokesh M. Gupta, Tucson, AZ (US); Trung N. Nguyen, Tucson, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 107 days.

This patent is subject to a terminal disclaimer.

(21) Appl. No.: 16/735,687

(22) Filed: Jan. 6, 2020

(65) Prior Publication Data

US 2020/0142742 A1 May 7, 2020

Related U.S. Application Data

(63) Continuation of application No. 15/431,637, filed on Feb. 13, 2017, now Pat. No. 10,545,795, which is a
(Continued)

(51) Int. Cl.
*G06F 9/50* (2006.01)
*G06F 3/06* (2006.01)
*G06F 12/02* (2006.01)

(52) U.S. Cl.
CPC ............ *G06F 9/5005* (2013.01); *G06F 3/067* (2013.01); *G06F 3/0613* (2013.01);
(Continued)

(58) Field of Classification Search
CPC ..................................................... G06F 9/5033
See application file for complete search history.

(56) References Cited

U.S. PATENT DOCUMENTS 6,769,017 B1    7/2004   Bhat et al.
7,805,710 B2    9/2010   North
(Continued)

FOREIGN PATENT DOCUMENTS

JP          5419325        2/2014

OTHER PUBLICATIONS

List of IBM Patents or Patent Applications Treated as Related, Jan. 6, 2020, 2 pp. [18.661 C2 (Appendix P)].
(Continued)

*Primary Examiner* — Eric C Wai
(74) *Attorney, Agent, or Firm* — Konrad Raynes Davda & Victor LLP; Rabindranath Dutta

(57) ABSTRACT

A plurality of processing entities in which a plurality of tasks are executed are maintained. Memory access patterns are determined for each of the plurality of tasks by dividing a memory associated with the plurality of processing entities into a plurality of memory regions, and for each of the plurality of tasks, determining how many memory accesses take place in each of the memory regions, by incrementing a counter associated with each memory region in response to a memory access. Each of the plurality of tasks are allocated among the plurality of processing entities, based on the determined memory access patterns for each of the plurality of tasks.

15 Claims, 10 Drawing Sheets

Related U.S. Application Data continuation of application No. 15/269,640, filed on Sep. 19, 2016, now Pat. No. 9,606,835.

(52) U.S. Cl.
CPC .......... *G06F 3/0622* (2013.01); *G06F 3/0631* (2013.01); *G06F 3/0659* (2013.01); *G06F 9/5016* (2013.01); *G06F 9/5033* (2013.01); *G06F 12/023* (2013.01)

(56) References Cited

U.S. PATENT DOCUMENTS

| | | | |
|---|---|---|---|
| 8,225,076 | B1 | 7/2012 | Coon et al. |
| 8,327,084 | B2 | 12/2012 | von Praun et al. |
| 9,286,262 | B2 | 3/2016 | Lippett |
| 9,606,835 | B1 | 3/2017 | Borlick et al. |
| 2013/0138885 | A1 | 5/2013 | Kurtz et al. |
| 2016/0314826 | A1 | 10/2016 | Augustine et al. |
| 2018/0081727 | A1 | 3/2018 | Borlick et al. |

OTHER PUBLICATIONS

R. Mancuso, et al., "Real-Time Cache Management Framework for Multi-core Architectures", In Real-Time and Embedded Technology and Applications Symposium (RTAS), 2013, pp. 45-54.

U.S. Appl. No. 15/264,382, filed Sep. 13, 2016.

U.S. Appl. No. 15/264,406, filed Sep. 13, 2016.

U.S. Pat. No. 7,805,710 is the English counterpart of JP5419325, Feb. 19, 2014.

English translation of JP5419325, Feb. 19, 2014.

Notice of Allowance dated Nov. 21, 2016, pp. 11, for U.S. Appl. No. 15/269,640, filed Sep. 19, 2016, (18.661).

Office Action 1 for U.S. Appl. No. 15/431,637, dated Feb. 21, 2019, 14 pp. [18.661C1 (OA1)].

Response to Office Action 1 for U.S. Appl. No. 15/431,637, dated May 21, 2019, 9 pp. [18.661 C1 (ROA1)].

Notice of Allowance 1 for U.S. Appl. No. 15/431,637, dated Sep. 11, 2019, 5 pp. [18.66101 (NOA1)].

DETERMINATION OF MEMORY ACCESS PATTERNS OF TASKS IN A MULTI-CORE PROCESSOR

CROSS-REFERENCE TO RELATED APPLICATION

This application is a continuation of U.S. patent application Ser. No. 15/431,637, filed Feb. 13, 2017, wherein U.S. patent application Ser. No. 15/431,637 is a continuation of U.S. patent application Ser. No. 15/269,640, filed Sep. 19, 2016, which applications are incorporated herein by reference in their entirety.

BACKGROUND

1. Field

Embodiments relate to the determination of memory access patterns of tasks in a multi-core processor.

2. Background

A storage system may control access to storage for one or more host computational devices that may be coupled to the storage system over a network. A storage management application that executes in the storage system may manage a plurality of storage devices, such as disk drives, tape drives, flash drives, direct access storage devices (DASD), etc., that are coupled to the storage system. A host may send Input/Output (I/O) commands to the storage system and the storage system may execute the I/O commands to read data from the storage devices or write data to the storage devices.

The storage system may include two or more servers, where each server may be referred to as a node, a storage server, a processor complex, a Central Processor Complex (CPC), or a Central Electronics Complex (CEC). Each server may be included in a cluster. Each server may have a plurality of processor cores and the servers may share the workload of the storage system. In a two server configuration of the storage system, either server can failover to the other if there is a failure or a planned downtime for one of the two servers. For example, a first server may failover to a second server, if there is a failure of the first server.

A computational device, such as a host or a server of storage system, may include a plurality of processors and form a multiprocessing system. The plurality of processors may be referred to as cores. Processes may be executed in parallel in the plurality of cores of the computational device.

SUMMARY OF THE PREFERRED EMBODIMENTS

Provided are a method, a system, and a computer program product in which a plurality of processing entities in which a plurality of tasks are executed are maintained. Memory access patterns are determined for each of the plurality of tasks by dividing a memory associated with the plurality of processing entities into a plurality of memory regions, and for each of the plurality of tasks, determining how many memory accesses take place in each of the memory regions, by incrementing a counter associated with each memory region in response to a memory access. Each of the plurality of tasks are allocated among the plurality of processing entities, based on the determined memory access patterns for each of the plurality of tasks.

In certain embodiments, the memory access patterns are determined by a profiler tool that performs operations in which in response to a task accessing a new memory region, a new counter is allocated for the task to keep track of accesses to the new memory region.

In further embodiments, the allocating of each of the plurality of tasks among the plurality of processing entities is performed subsequent to collection of a set of access statistics related to a workload that has been completed for the plurality of processing entities.

In certain embodiments, each task of the plurality of tasks has a counter associated with each memory region accessed by each task, wherein no counter is maintained for a memory region that has not been accessed by the task.

In yet further embodiments, the plurality of processing entities are cores in a processor complex of a dual-server storage system that control access to a plurality of storage devices for one or more hosts. The profiler tool is activated while input/output (I/O) is being performed via the processor complex.

In certain embodiments, a set of tasks that share access to a same region of memory is determined. The set of tasks are allocated to a same processing entity for execution, wherein each task of the set of tasks access the same region of memory more than a threshold percentage of times.

In further embodiments, a task whose memory access patterns are distributed among a plurality of memory regions is determined. The determined task is allocated to a separate processing entity for execution, wherein the task does not access any region of the plurality of memory regions more than a threshold percentage of times.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments provide a task distribution allocation application and a memory access profiling tool in a multi-core processor in which a memory is divided into a plurality or memory regions, and a counter is used for counting hits for a task in the different memory regions. The tasks that have hits primarily in the same memory region are marked as related and are allocated to the same core. The tasks whose hits are distributed in different memory regions are considered cache hostile and are allocated to different cores.

Exemplary Embodiments

Figure 1:
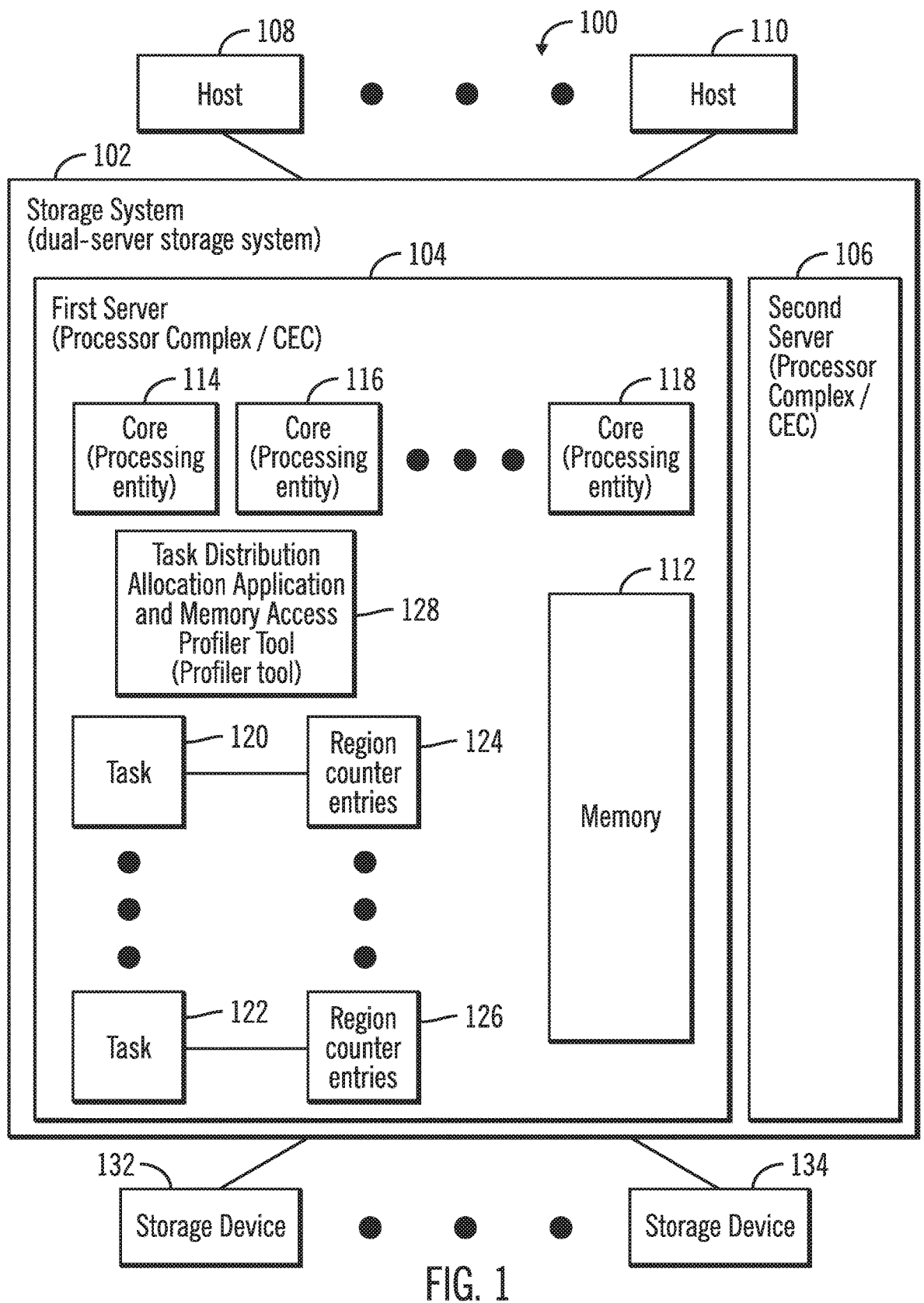
FIG. 1 illustrates a block diagram of a computing environment comprising a storage system comprising a first server and a second server in which a task distribution allocation application and a memory access profiler tool is implemented, and where the storage system communicates with a plurality of hosts over a network, in accordance with certain embodiments.

FIG. 1 illustrates a block diagram of a computing environment 100 comprising a storage system 102 comprising a first server 104 and a second server 106, where the storage system 102 communicates with a plurality of hosts 108, 110 over a network, in accordance with certain embodiments.

The storage system 102, the servers 104, 106 and the hosts 108, 110 may comprise any suitable computational device including those presently known in the art, such as, a personal computer, a workstation, a server, a mainframe, a hand held computer, a palm top computer, a telephony device, a network appliance, a blade computer, a processing device, a controller, etc. The plurality of servers 104, 106 may provide redundancy because if one server undergoes a failure from which recovery is not possible, an alternate server may perform the functions of the server that failed. Each of the plurality of servers 104, 106 may be referred to as a processing complex or a central electronics complex (CEC) and may include one or more processors and/or processor cores. The storage system 102 may also be referred to as a dual-server storage system.

The storage system 102, the servers 104, 106 and the hosts 108, 110 may be elements in any suitable network, such as, a storage area network, a wide area network, the Internet, an intranet. In certain embodiments, storage system 102, the servers 104, 106 and the hosts 108, 110 may be elements in a cloud computing environment.

The first server 104 includes memory 112, where in certain embodiments the memory 112 may be implemented with a volatile memory and/or non-volatile memory and the memory may act as a main memory and/or a cache.

It should be noted that the storage system 102 may be configured and accessed in many different ways. For example, virtualization may be performed to access the hardware elements of the storage system 102. Additionally, in certain embodiments, the storage system 102 may have a single server or more than two servers.

In certain embodiments, each of the servers 104, 106 may have corresponding applications and data structures implemented in each, and the applications and data structures implemented in the first server 104 are shown. The server 106 may have similar applications and data structures, and may have similar hardware, firmware, and/or software.

The first server 104 includes a plurality of processing entities 114, 116, 118, where in certain embodiments each processing entity is a central processing unit (CPU). In certain embodiments, each processing entity 114, 116, 118, is the lowest granularity of a processor that is configurable to execute a task, where an exemplary plurality of tasks 120, 122 are shown in FIG. 1. While only three processing entities are identified by reference numerals 114, 116, 118 in FIG. 1, it is understood that there may be more than three processing entities in the server 104. The plurality of processing entities 114, 116, 118 may also be referred to as cores.

A plurality of region counter entries 124, 126 are associated with the plurality of tasks 120, 122 where the region counter entries 124, 126 keep track of the number of hits (i.e., accesses) to different regions of the memory 112.

A task distribution allocation application and memory access profiler tool 128 that executes in the first server 104 is used to populate the plurality of region counter entries 124, 126 for the plurality of tasks 120, 122, and then based on analysis of the memory access patterns provided by the region counter entries 124, 126 distribute and allocate each task to the processing entities 114, 116, 118.

The storage system 102 receives commands from the hosts 108, 110 and allows input/output (I/O) access to data stored in at least the memory 112, and the storage devices 130, 132 that are coupled to the storage system 102.

Figure 2:
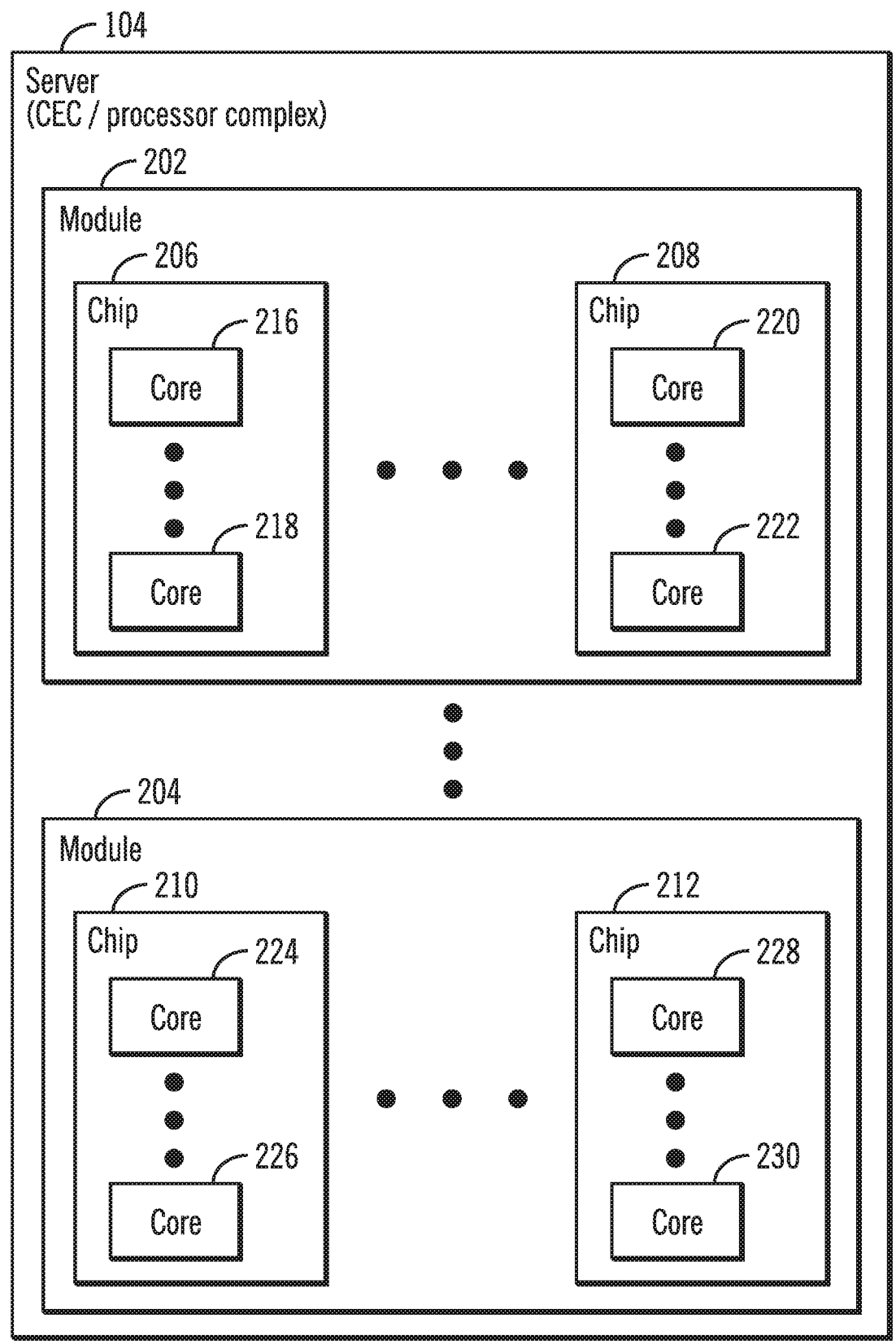
FIG. 2 illustrates a block diagram of a processor complex such as a server or a central electronics complex (CEC), in accordance with certain embodiments.

FIG. 2 illustrates a block diagram of the server 104 that comprises a processor complex or a central electronics complex (CEC), in accordance with certain embodiments. The server 104 may be comprised of a plurality of modules 202, 204 where each module is comprised of a plurality of chips 206, 208, 210, 212, and where each chip is comprised of a plurality of cores 216, 218, 220, 222, 224, 226, 228, 230 as shown in FIG. 2, where the cores may also be referred to as processing entities.

Figure 3:
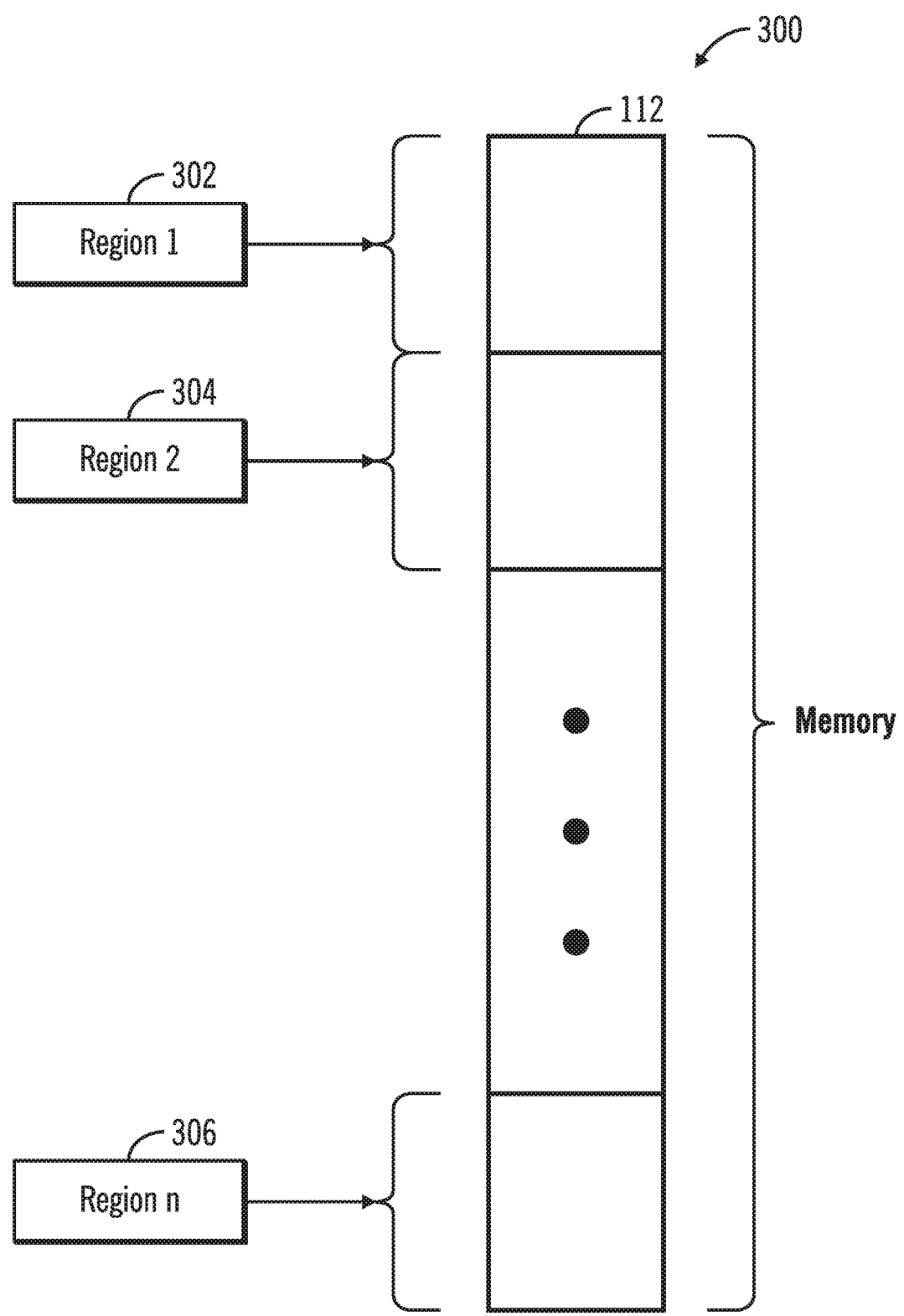
FIG. 3 illustrates a block diagram that shows a memory being divided to a plurality of regions, in accordance with certain embodiments.

FIG. 3 illustrates a block diagram 300 that shows a memory 112 being divided to a plurality of regions 302, 304, 306 by the task distribution allocation application and memory access profiler tool 128, in accordance with certain embodiments. The number of regions that are created may differ in different embodiments.

Figure 4:
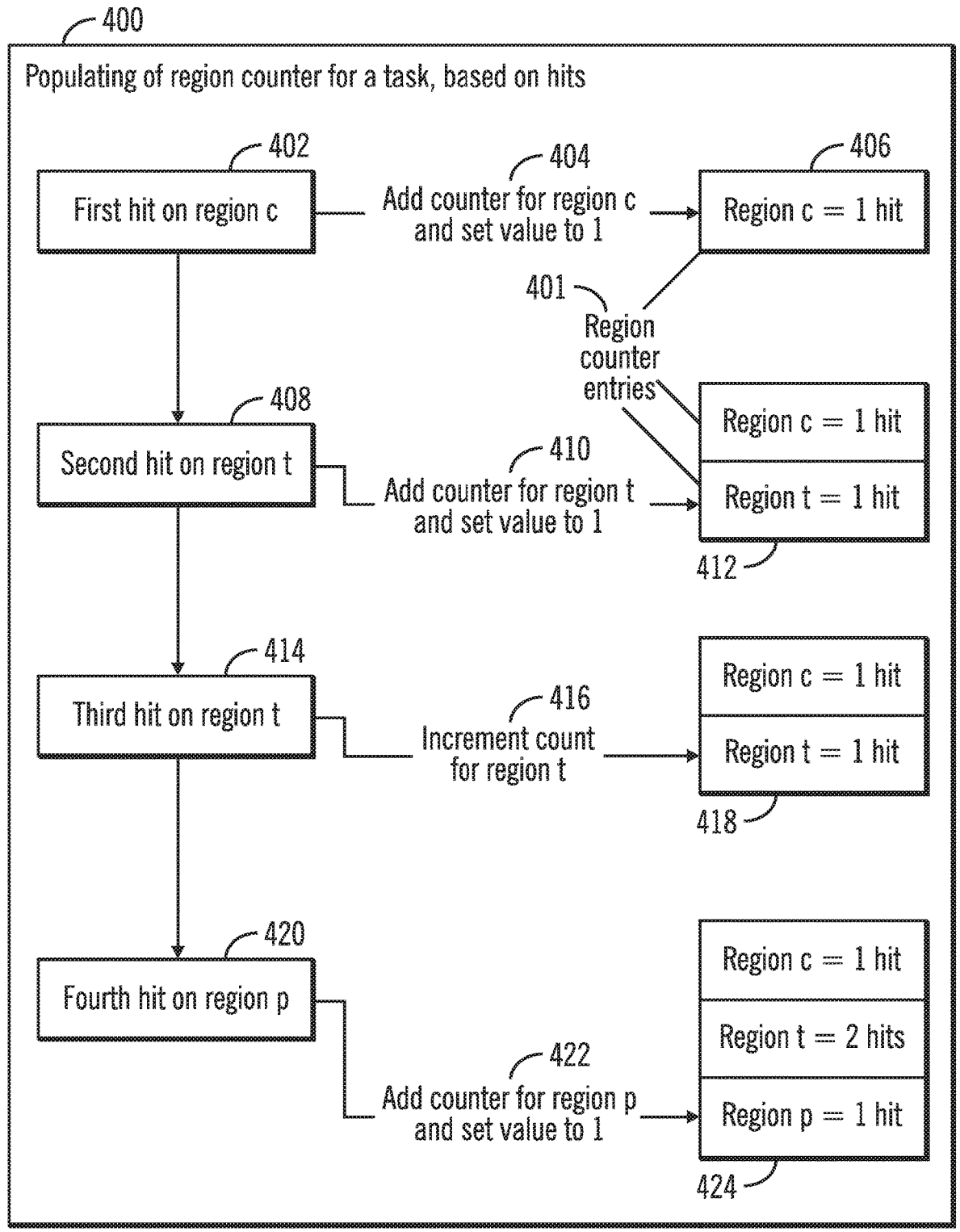
FIG. 4 illustrates a block diagram that shows the populating of region counters for a task based on hits on regions of the memory, in accordance with certain embodiments.

FIG. 4 illustrates a block diagram 400 that shows the populating of region counters for a task based on hits on regions of the memory 112, in accordance with certain embodiments. Exemplary entries for region counters are shown via reference numeral 401.

The task distribution allocation application and memory access profiler tool 128 keeps track of the hit to different memory regions for each task of the plurality of tasks 120, 122. If a first hit is on memory region c for a task (reference numeral 402), then a counter is added for region c and its value is set to 1 (reference numerals 404, 406). Subsequently if a second hit is on region t for the task (reference numeral 408) then a counter for region t is added and its value is set to 1 (reference numerals 410, 412).

Subsequently, a third hit for the task is again on region t (reference numeral 414) and the counter for region t is then incremented and the counter entry for region t is shown to have 2 hits after the increment is performed (reference numerals 416, 418). The fourth hit for the task is on region p (reference numeral 420) and in response the task distribution allocation application and memory access profiler tool 128 adds a new counter for region p and sets the value to 1 (reference numerals 422, 424).

Therefore FIG. 4 illustrates certain embodiments in which to save memory space a new region counter entry for a task is created only if a hit occurs on a new memory region for the task. The regions counters for a task keep track of the number of hits on different memory regions for the task.

Figure 5:
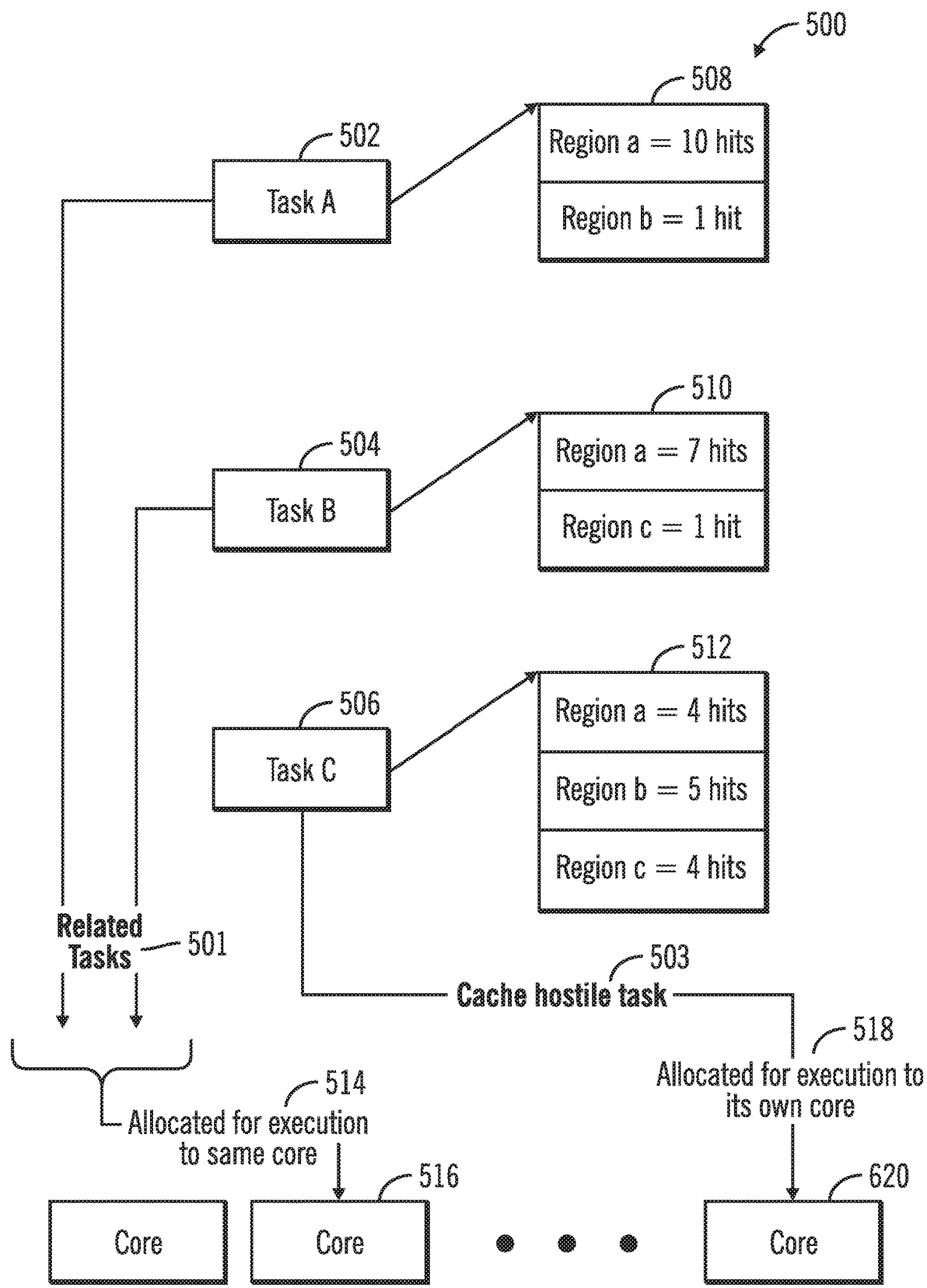
FIG. 5 illustrates a block diagram that shows how related tasks and cache hostile tasks are determined, in accordance with certain embodiments.

FIG. 5 illustrates a block diagram 500 that shows how related tasks 501 and cache hostile tasks 503 are determined by the task distribution allocation application and memory access profiler tool 128, in accordance with certain embodiments.

In FIG. 5, three exemplary tasks, task A 502, 504, 506 are shown. The region counters for each of the tasks are also shown via reference numerals 508, 510, 512, where reference numeral 508 shows the region counters for task A 502, reference numeral 510 shows the region counters for task B 504, and reference numeral 512 shows the region counters for task C 506.

In certain embodiments, the task distribution allocation application and memory access profiler tool 128 determines that task A 502 and task B 504 are related tasks 501 as they both primarily have hits on region a with 10 out of the 11 hits of task A 502 on region a, and 7 out of the 8 hits of task B on region a (as shown via reference numerals 508, 510). Since both task A 502 and task B 504 appear to have hits primarily (beyond a predetermined threshold percentage of times) on the same memory region (region a), task A 502 and task B 504 are considered related tasks 501 and are allocated for execution to the same core (shown via reference numerals 514, 516).

In certain embodiments, the task distribution allocation application and memory access profiler tool 128 determines that task C 506 is a cache hostile task 503. Task C 506 which is a cache hostile task does not primarily share any memory region for hits with other tasks, and also does not access any region of the plurality of memory regions more than a predetermined threshold percentage of times (as shown via reference numerals 512, 508, 510). As a result, task C 506 is allocated for execution to its own core (as shown via reference numerals 518, 520).

Therefore, FIG. 5 illustrates certain embodiments in which the task distribution allocation application and memory access profiler tool 128 analyzes the memory access patterns stored in the region counter entries 124, 126 and categorizes tasks into related tasks 501 or cache hostile tasks 503 and based on the categorization allocates the cores to different tasks.

Figure 6:
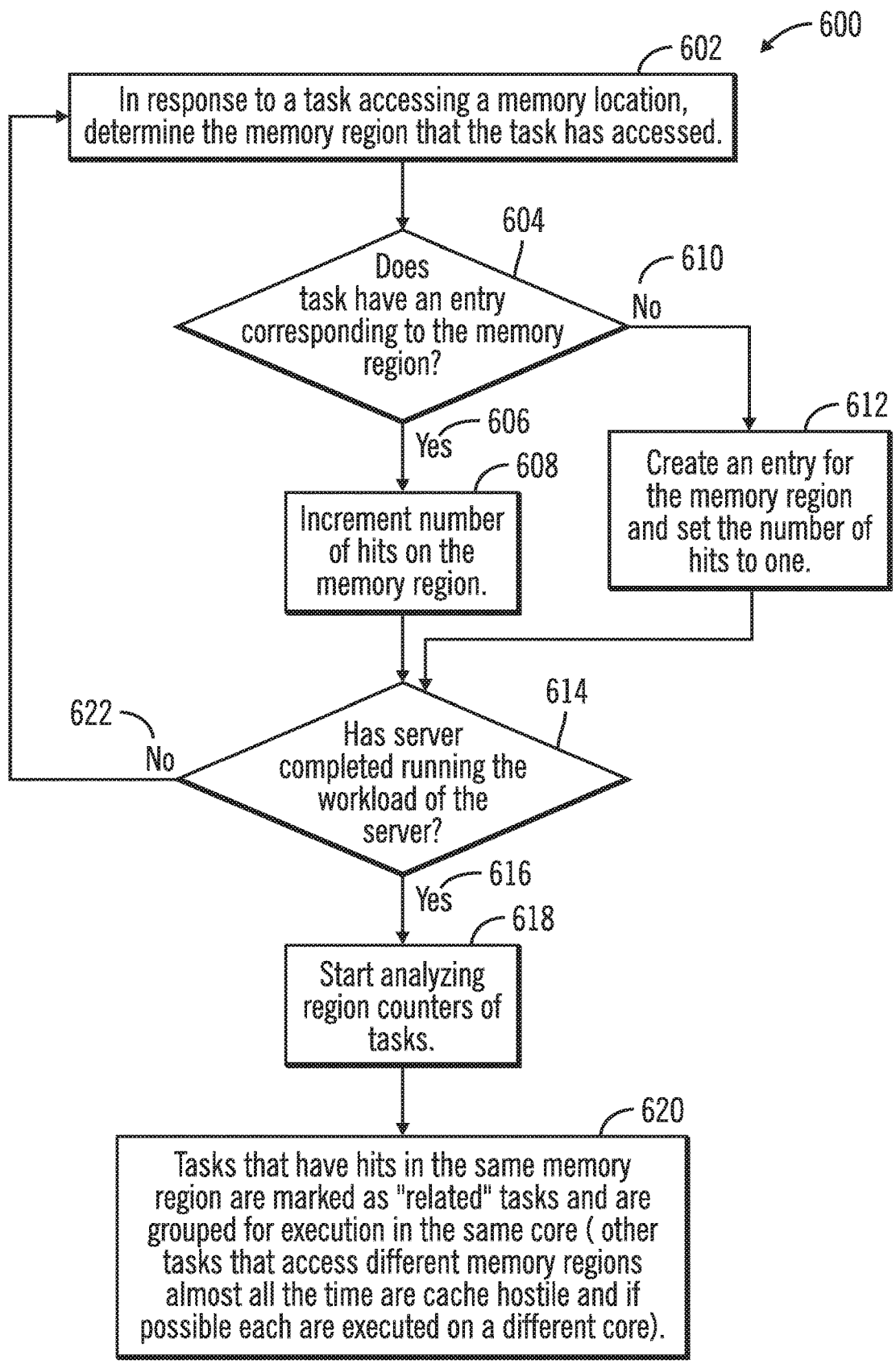
FIG. 6 illustrates a flowchart that shows operations for determination of memory access patterns and categorization of tasks, in accordance with certain embodiments.

FIG. 6 illustrates a flowchart 600 that shows operations for determination of memory access patterns and categorization of tasks, in accordance with certain embodiments. The operations shown in FIG. 6 may be performed by the task distribution allocation application and memory access profiler tool 128 that executes in the server 104.

Control starts at block 602 in which in response to a task accessing a memory location, the task distribution allocation application and memory access profiler tool 128 determines the memory region that the task has accessed. Control proceeds to block 604 in which a determination is made as whether the task has an entry corresponding to the memory region that the task has accessed. If so ("Yes" branch 606) then the number of hits on the memory region is incremented (at block 608), and if not ("No" branch 610) an entry is created for the memory region and the number of hits for the memory region is set to one (reference numeral 612).

From blocks 608 and 612 control proceeds to block 614 in which the task distribution allocation application and memory access profiler tool 128 determines whether the server 104 has completed running the workload of the server 104. If so ("Yes" branch 616), then the task distribution allocation application and memory access profiler tool 128 starts analyzing (at block 618) the region counters 124, 126 of the tasks 120, 122. Tasks that have hits in the same memory region are marked as "related" tasks and are grouped for execution in the same core and other tasks that access different memory regions almost all the time are cache hostile and if possible each are executed on a different core (block 620).

If at block 614 it is determined that the server 104 has not completed running the workload on the server 104 ("No" branch 622) then control returns to block 602.

Therefore, FIG. 6 illustrates certain embodiments in which counts are kept for hits to different memory regions and tasks are allocated to cores based on analysis of the counts of hits to different memory regions.

Figure 7:
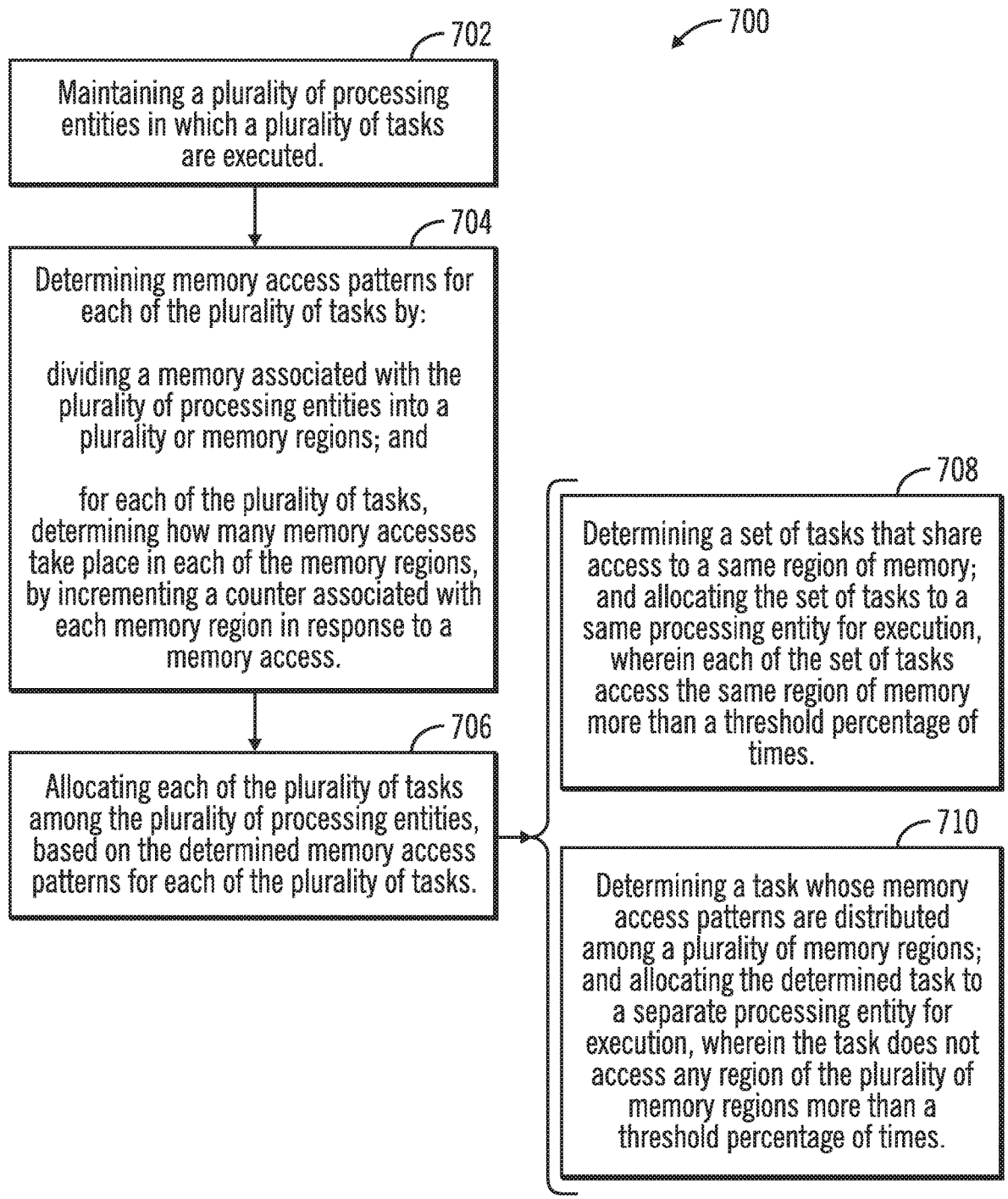
FIG. 7 illustrates a flowchart that shows operations for determination of memory access patterns and allocation of tasks to processing entities based on the memory access patterns, in accordance with certain embodiments.

FIG. 7 illustrates a flowchart 700 that shows operations for determination of memory access patterns and allocation of tasks to processing entities based on the memory access patterns, in accordance with certain embodiments. The operations shown in FIG. 7 may be performed by the task distribution allocation application and memory access profiler tool 128 that executes in the server 104.

Control starts at block 702 in which a plurality of processing entities 114, 116, 118 in which a plurality of tasks 120, 122 are executed are maintained. Memory access patterns are determined (at block 704) for each of the plurality of tasks 120, 122 by dividing a memory 112 associated with the plurality of processing entities into a plurality of memory regions 302, 304, 306, and for each of the plurality of tasks 120, 122, by determining how many memory accesses take place in each of the memory regions, by incrementing a counter associated with each memory region in response to a memory access. Each of the plurality of tasks 120, 122 are allocated (at block 706) among the plurality of processing entities 114, 116, 118, based on the determined memory access patterns for each of the plurality of tasks 120, 122.

In certain embodiments the allocating of block 706 is performed by determining (at block 708) a set of tasks that share access to a same region of memory. The set of tasks (related tasks) are allocated to a same processing entity for execution, where each of the set of tasks access the same region of memory more than a threshold percentage of times.

In certain embodiments the allocating of block 706 is performed by determining (at block 710) a task whose memory access patterns are distributed among a plurality of memory regions. The determined task (cache hostile task) is allocated to a separate processing entity for execution, wherein the task does not access any region of the plurality of memory regions more than a threshold percentage of times.

Therefore FIGS. 1-7 illustrate certain embodiments for maintaining hit counts to different regions of memory for each task, and based on analysis of the hit counts to different regions for a plurality of tasks, categorize certain tasks as related tasks and other tasks as cache hostile tasks, and based on the categorization allocate the tasks to the plurality of cores.

In certain embodiments the task distribution allocation application and memory access profiler tool 128 may also be used dynamically to improve performance while the server 104 is running I/O. The task distribution allocation application and memory access profiler tool 128 may then determine tasks that have hits in the same region and mark them related. The task distribution allocation application and memory access profiler tool 128 may also find threads that are cache hostile while the I/O is running. The microcode of the server 104 may use this information dynamically to dispatch tasks optimally.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
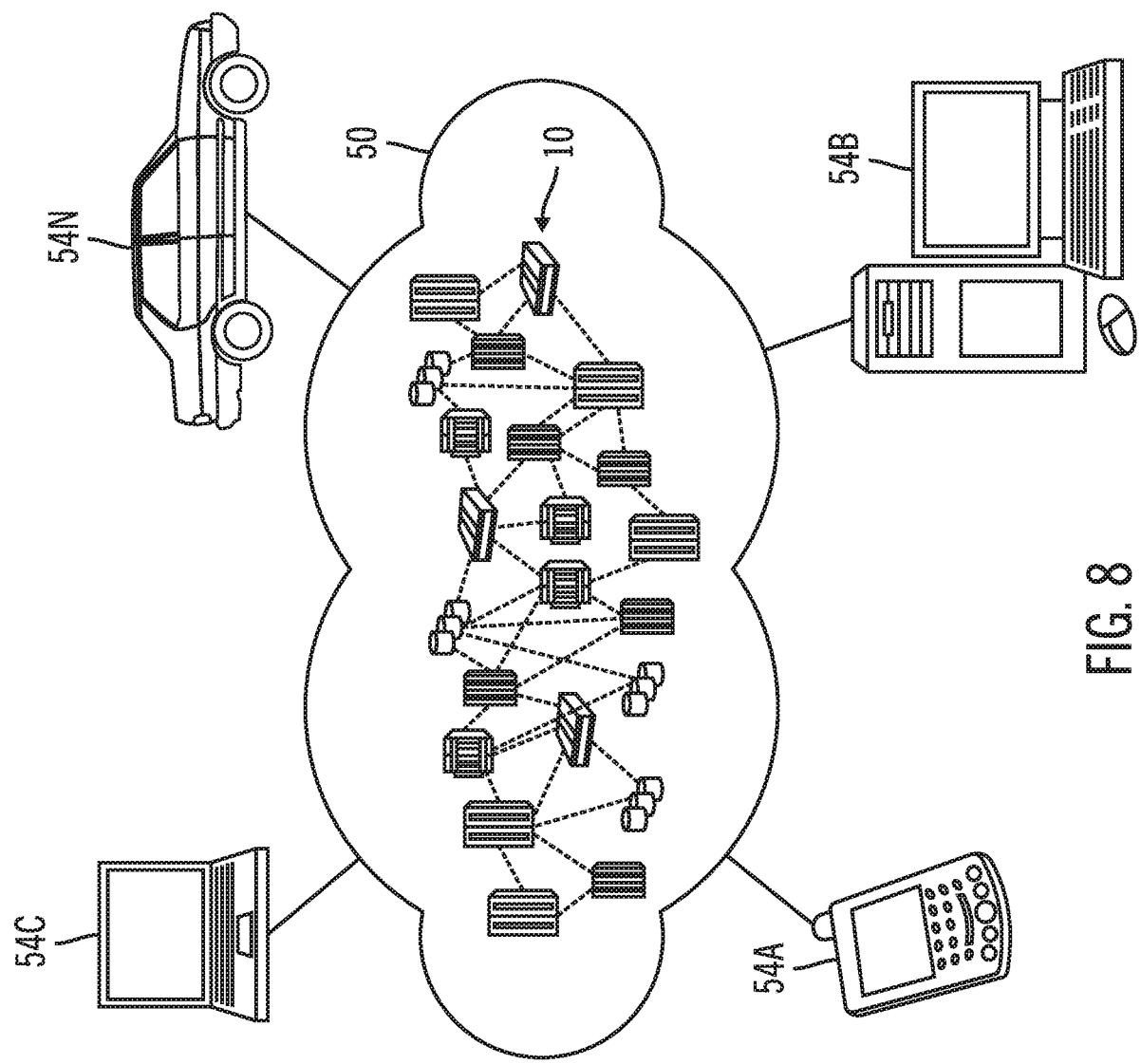
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
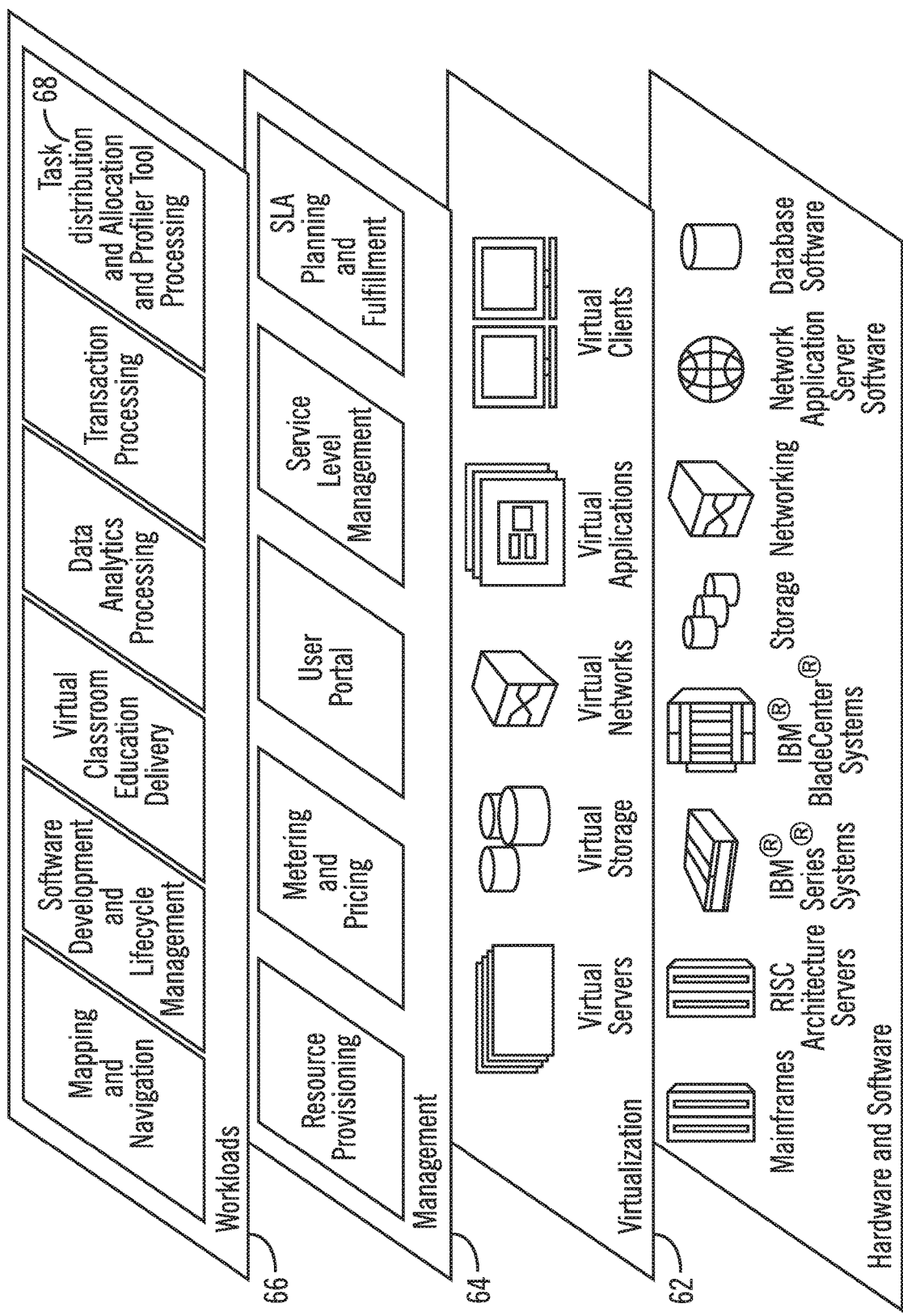
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the task distribution and allocation and profiler tool processing 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
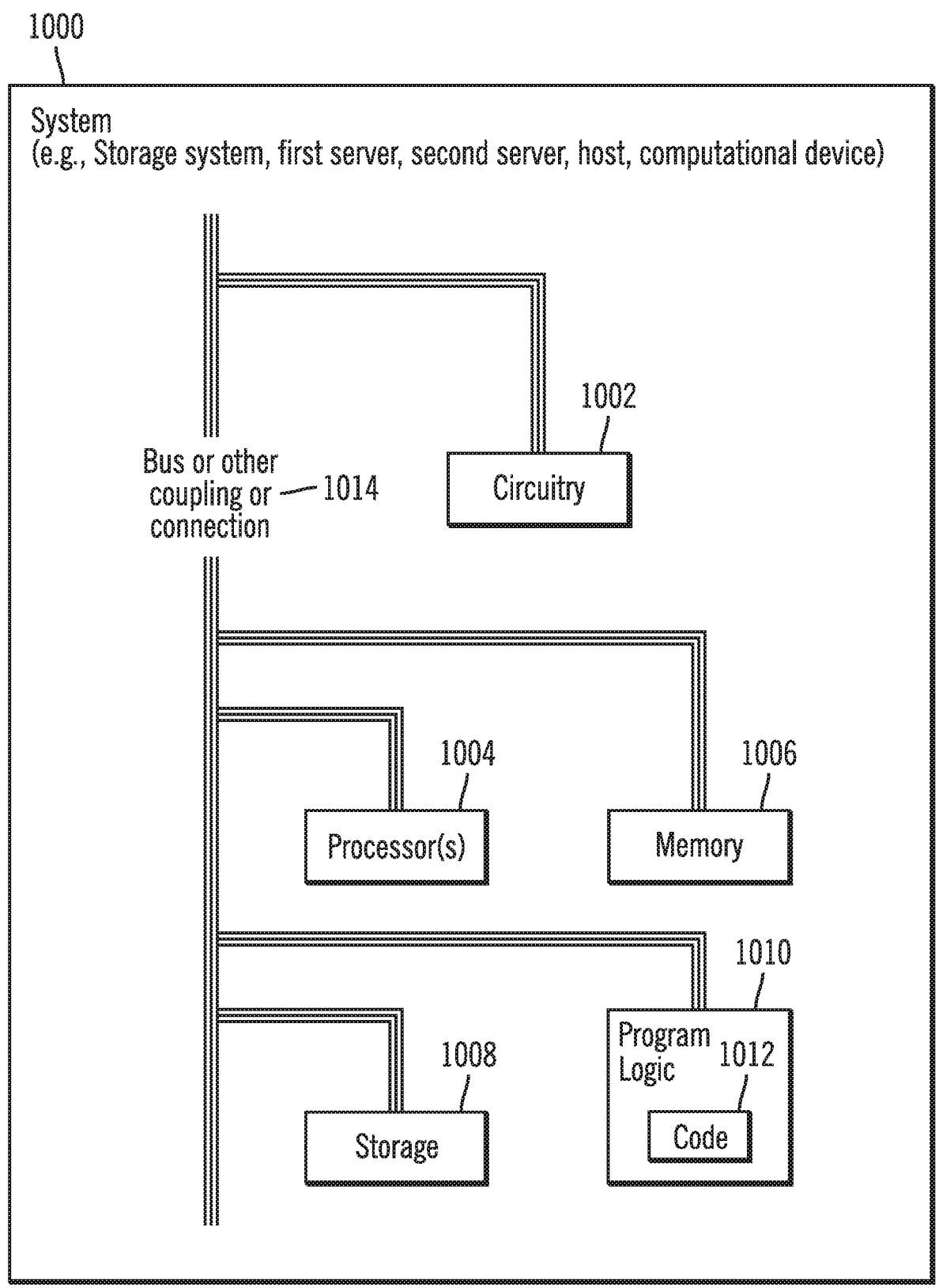
FIG. 10 illustrates a block diagram of a computational system that shows certain elements that may be included in the storage system, servers, and/or the host(s), as described in FIGS. 1-9, in accordance with certain embodiments.

FIG. 10 illustrates a block diagram that shows certain elements that may be included in the storage system 102, the first server 104, the second server 106, the hosts 108, 110 or other computational devices, in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   determining memory access patterns for each of a plurality of tasks by dividing a memory associated with a plurality of processing entities into a plurality of memory regions, wherein subsequent to the dividing of the memory, entries associated with the plurality of memory regions are managed and hits on the plurality of memory regions are determined, in response to memory accesses by the plurality of tasks; and
   distributing each of the plurality of tasks among the plurality of processing entities, based on the determined memory access patterns for each of the plurality of tasks.

2. The method of claim 1, wherein the memory access patterns are determined by a profiler tool that performs operations comprising:
   in response to a task accessing a new memory region, allocating a new counter for the task to keep track of accesses to the new memory region.

3. The method of claim 1, wherein allocating of each of the plurality of tasks among the plurality of processing entities is performed subsequent to collection of a set of access statistics related to a workload that has been completed for the plurality of processing entities.

4. The method of claim 1, wherein each task of the plurality of tasks has a counter associated with each memory region accessed by each task, wherein no counter is maintained for a memory region that has not been accessed by the task, and wherein:
   the plurality of processing entities are cores in a processor complex of a dual-server storage system that control access to a plurality of storage devices for one or more hosts; and
   a profiler tool is activated while input/output (I/O) is being performed via the processor complex.

5. The method of claim 1, the method further comprising:
   determining a task whose memory access patterns are distributed among a plurality of memory regions; and
   allocating the determined task to a separate processing entity for execution, wherein the task does not access any region of the plurality of memory regions more than a threshold percentage of times.

6. A system, comprising:
   a processor; and
   a computer readable storage medium having program instructions embodied therewith, the program instructions executable by the processor to cause the processor to perform operations, the operations comprising:
      determining memory access patterns for each of a plurality of tasks by dividing a memory associated with a plurality of processing entities into a plurality of memory regions, wherein subsequent to the dividing of the memory, entries associated with the plurality of memory regions are managed and hits on the plurality of memory regions are determined, in response to memory accesses by the plurality of tasks; and
      distributing each of the plurality of tasks among the plurality of processing entities, based on the determined memory access patterns for each of the plurality of tasks.

7. The system of claim 6, wherein the memory access patterns are determined by a profiler tool that performs operations comprising:
   in response to a task accessing a new memory region, allocating a new counter for the task to keep track of accesses to the new memory region.

8. The system of claim 6, wherein allocating of each of the plurality of tasks among the plurality of processing entities is performed subsequent to collection of a set of access statistics related to a workload that has been completed for the plurality of processing entities.

9. The system of claim 6, wherein each task of the plurality of tasks has a counter associated with each memory region accessed by each task, wherein no counter is maintained for a memory region that has not been accessed by the task, and wherein:
- the plurality of processing entities are cores in a processor complex of a dual-server storage system that control access to a plurality of storage devices for one or more hosts; and
- a profiler tool is activated while input/output (I/O) is being performed via the processor complex.

10. The system of claim 6, the operations further comprising:
- determining a task whose memory access patterns are distributed among a plurality of memory regions; and
- allocating the determined task to a separate processing entity for execution, wherein the task does not access any region of the plurality of memory regions more than a threshold percentage of times.

11. A computer program product, the computer program product comprising a computer readable storage medium having program instructions embodied therewith, the program instructions executable to cause operations to be performed, the operations comprising:
- determining memory access patterns for each of a plurality of tasks by dividing a memory associated with a plurality of processing entities into a plurality of memory regions, wherein subsequent to the dividing of the memory, entries associated with the plurality of memory regions are managed and hits on the plurality of memory regions are determined, in response to memory accesses by the plurality of tasks; and
- distributing each of the plurality of tasks among the plurality of processing entities, based on the determined memory access patterns for each of the plurality of tasks.

12. The computer program product of claim 11, wherein the memory access patterns are determined by a profiler tool that performs operations comprising:
- in response to a task accessing a new memory region, allocating a new counter for the task to keep track of accesses to the new memory region.

13. The computer program product of claim 11, wherein allocating of each of the plurality of tasks among the plurality of processing entities is performed subsequent to collection of a set of access statistics related to a workload that has been completed for the plurality of processing entities.

14. The computer program product of claim 11, wherein each task of the plurality of tasks has a counter associated with each memory region accessed by each task, wherein no counter is maintained for a memory region that has not been accessed by the task, and wherein:
- the plurality of processing entities are cores in a processor complex of a dual-server storage system that control access to a plurality of storage devices for one or more hosts; and
- a profiler tool is activated while input/output (I/O) is being performed via the processor complex.

15. The computer program product of claim 11, the operations further comprising:
- determining a task whose memory access patterns are distributed among a plurality of memory regions; and
- allocating the determined task to a separate processing entity for execution, wherein the task does not access any region of the plurality of memory regions more than a threshold percentage of times.

* * * * *